United States Patent [19]

Fourcade et al.

[11] Patent Number: 4,593,379
[45] Date of Patent: Jun. 3, 1986

[54] METHOD AND A DEVICE FOR SYNCHRONIZATION OF MESSAGES

[75] Inventors: Pierre Fourcade; Dominique Dupray, both of Paris, France

[73] Assignee: Thomson-CSF, Paris, France

[21] Appl. No.: 337,408

[22] Filed: Jan. 6, 1982

[30] Foreign Application Priority Data

Jan. 9, 1981 [FR] France .................... 81 00313

[51] Int. Cl.⁴ .............................................. G01S 1/30
[52] U.S. Cl. .................................. 364/900; 328/155; 324/83 FE; 315/194
[58] Field of Search ................. 315/194; 375/82; 328/155; 324/83 M, 83 FE; 364/200 MS File, 900 MS File

[56] References Cited

U.S. PATENT DOCUMENTS

| | | | |
|---|---|---|---|
| 3,789,408 | 1/1974 | Ichihara et al. | 343/105 |
| 3,889,186 | 6/1975 | Larson | 324/83 |
| 4,095,186 | 6/1978 | Vesel | 328/133 |
| 4,101,821 | 7/1978 | Kirby | 323/119 |
| 4,190,807 | 2/1980 | Weber | 331/1 A |
| 4,215,314 | 7/1980 | Addor | 328/55 |
| 4,288,874 | 9/1981 | Yamada | 375/118 |
| 4,384,500 | 5/1983 | Friberg | 83/74 |
| 4,457,005 | 6/1984 | Burke et al. | 375/82 |

FOREIGN PATENT DOCUMENTS 1526711 5/1977 United Kingdom .

OTHER PUBLICATIONS

Proceedings of the Symposium on Computer Processing in Communications, Apr. 8–10, 1969, "Linear Adaptation" by Allen Gersho, pp. 653–664.

Primary Examiner—Gareth D. Shaw
Assistant Examiner—Melinda B. Thaler
Attorney, Agent, or Firm—Oblon, Fisher, Spivak, McClelland & Maier

[57] ABSTRACT

A method and device for synchronization of messages, wherein the phase of a reception clock signal is controlled in dependence on the phase of the messages received by causing the absolute value of the phase of the reception clock signal to vary by the quantity $A_i(2\pi/N)$ at the "$i^{th}$" transition of the received message, the sequence $|A_i|$ being a sequence of decreasing whole numbers where i varies from 1 to p and $2\pi/N$ designates the elementary step of variation of phase of the reception clock signal. The device includes a read-only memory for storing the values $A_i$.

7 Claims, 3 Drawing Figures

METHOD AND A DEVICE FOR SYNCHRONIZATION OF MESSAGES

BACKGROUND OF THE INVENTION

1. Field of the Invention

This invention relates to a method and a device for synchronization of messages. The invention is more particularly concerned with a method and a device for synchronizing short messages transmitted in the so-called frequency-evasion mode.

For a good understanding of the invention, the term "message" as used hereinafter has to be considered as a set of numerical data which are transmitted together and are necessary for the application of a given data-processing operation.

2. Description of the Prior Art

At the time of reception of messages, it is necessary to synchronize the receiver in accordance with the received data. The rate of transmission of bits constituting the message is in fact known at the receiver but the phase of these bits is not known and the received data must accordingly be utilized in order to reconstitute a reception clock signal which is in phase with said data.

"Frequency-evasion transmission" is generally understood to mean a mode of transmission in which each message is transmitted by modulating a different carrier frequency in order to prevent interception of these messages by a third party for whom they are not intended.

The problem of synchronization assumes even greater importance in transmission systems of the frequency-evasion type by reason of the fact that the phase deviations with respect to the received data are liable to vary as a function of the carrier frequency employed for the transmission. It accordingly becomes necessary to make use of high-performance synchronization devices which make it possible to restore the synchronization very rapidly, and even more so as the messages transmitted are of shorter duration.

In one known method of synchronization, the phase of a reception clock signal having a frequency equal to the frequency of the transmission clock signal is made to correspond to the phase of the messages received. This correspondence control operation consists in producing a variation, at each transition of a received message, in the phase of the reception clock signal by a quantity equal to $+$ or $-2\pi/N$ according as the transition of the received message leads or lags with respect to the corresponding transition of the reception clock signal (where $2\pi/N$ designates the elementary step of phase variation of the reception clock signal). The reception clock signal controlled in this manner is employed for sampling the message which has also been stored during the phase control stage. A device of this type is described in French patent Application No. 80 07 015 filed on Mar. 29th, 1980 in the name of the present applicant, the corresponding U.S. patent of which is U.S. Pat. No. 4,390,985.

A major drawback of such a device is that the synchronization of short messages is not possible. It is indeed clear that the number of transitions within the message will necessarily be smaller as the message is shorter (by transition is meant the changeover from one logic level to another) and the smaller the number of transitions, the longer the time taken to obtain synchronization. If it proves impossible in addition to modify the phase of the reception clock signal at each transition other than by elementary steps, it will immediately be apparent that the reception of a message will often be terminated before it has been possible to restore the synchronization.

SUMMARY OF THE INVENTION

The present invention is directed to a synchronization method and device for obtaining rapid synchronization of short messages.

In order to achieve this objective, one object of the invention is to provide a method of synchronization of messages comprising at least "p" transitions (where "p" is a whole number) by controlling the phase of a reception clock signal in dependence on the phase of the received messages and by sampling stored messages by means of the controlled reception clock signal. This method is such that the phase control operation consists on the one hand in producing a variation in the sign of the phase of the reception clock signal in accordance with the sign of the observed difference between the transitions of the received message and the corresponding transitions of the reception clock signal. The phase control operation consists on the other hand in producing a variation in the absolute value of the phase of the reception clock signal by a quantity $A_i 2\pi/N$ at the time of the "$i^{th}$" transition of the received message (where "i" is a whole number which is variable from 1 to "p" and $2\pi/N$ represents the elementary step of variation in phase of the reception clock signal). The sequence $|A_i|$ constitutes a series of decreasing integral values such that, irrespective of the value $\phi$ of relative phase shift between the reception clock signal and the received messages, there exist values $A_i$ which verify the relation $$\sum_{i=1}^{p} a_i A_i = M,$$

where M is a whole number such that $$\left| \phi - M \frac{2\pi}{N} \right| < \frac{2\pi}{N}$$

and where $a_i$ is equal either to $+1$ or to $-1$, depending on whether the $i^{th}$ transition of the received message leads or lags with respect to the corresponding transition of the reception clock signal.

A second object of the invention is to provide a device for carrying out the method of synchronization of messages.

The device comprises a delay line for storing received messages, a high-speed clock signal generator having a frequency N times higher than the transmission rate of the bits constituting the messages, a sampler coupled to the output of the delay line for sampling the stored messages delivered by the delay line by means of the reception clock signal and a circuit for controlling the phase of the reception clock signal in dependence on the phase of the received messages. The phase control circuit comprises a reception clock signal generator coupled to the sampler, a circuit for detecting transitions of the received messages, a circuit for detecting the sign of the difference between the transitions of the received messages and the corresponding reception clock signal transitions. The difference detection circuit is coupled on the one hand to the output of the circuit for detecting transitions of received messages and on the other hand to the output of the reception clock signal generator. The phase control circuit further includes a read only memory in which p bits of the decreasing sequence $|A_i|$ are stored in a binary representation in the form $N \pm A_i$ and an address counter connected to the output of the received-message transition detection circuit for counting the number of transitions of the received message and addressing the $N \pm A_i$ bits stored within the read only memory as a function of the signal of the difference between the transitions of the received messages and the corresponding transitions of the reception clock signal detected by the sign detection circuit. The $N \pm A_i$ bits read in the read only memory are applied as a phase control value to the reception clock signal generator in order to produce a phase variation of its clock signal by a quantity $\pm A_i 2\pi/N$.

BRIEF DESCRIPTION OF THE DRAWINGS

These and other features of the invention will be more apparent upon consideration of the following description and accompanying drawings, wherein.

DESCRIPTION OF THE PREFERRED EMBODIMENTS

Figure 1:
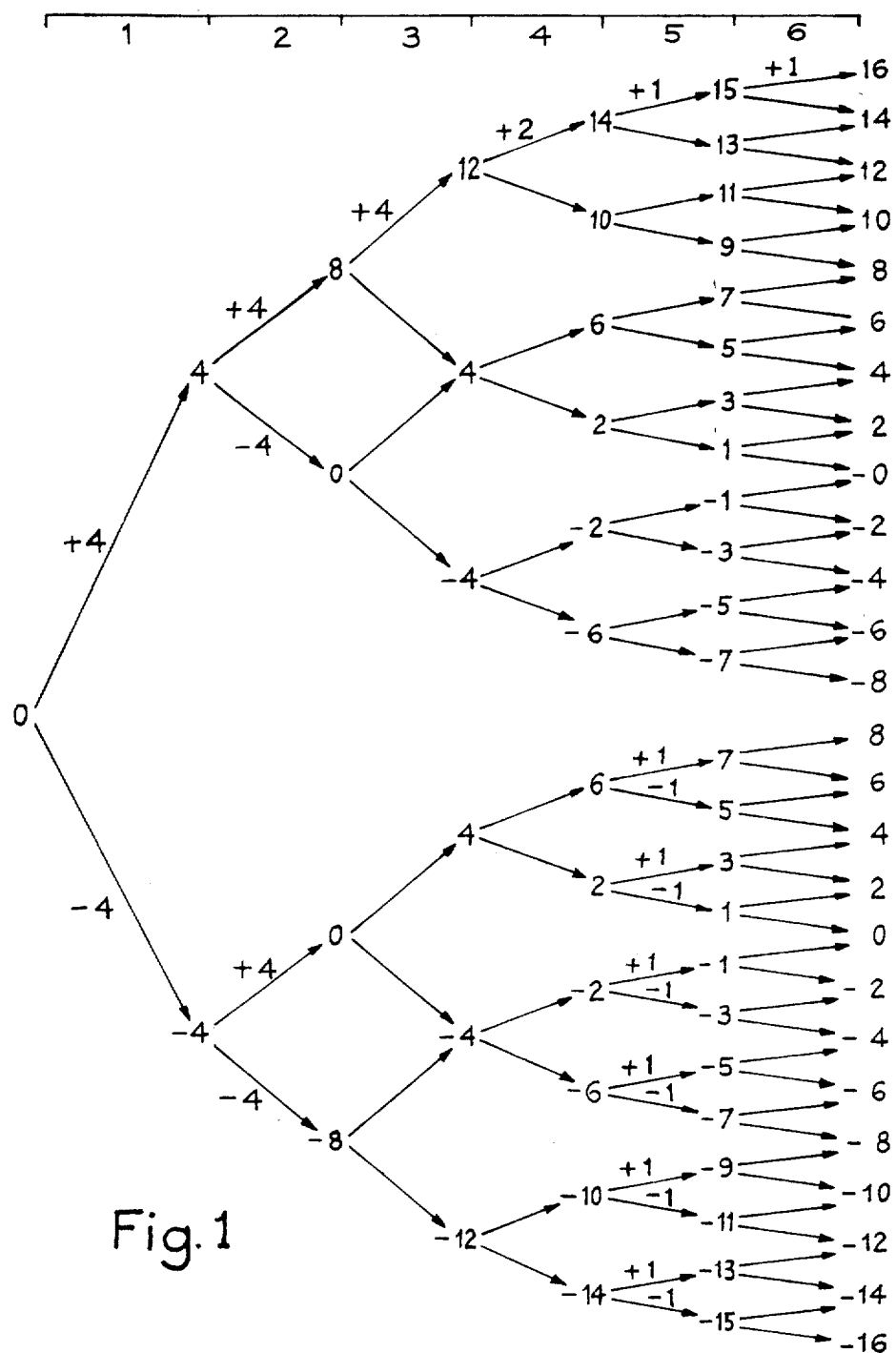
FIG. 1 is a diagram for the purpose of illustrating the method of synchronization according to the invention in the case of particular values of the numbers $A_i$, N and p.

The diagram of FIG. 1 shows the different ways of restoring synchronization at the time of reception of a message and starting from a desynchronized state represented by a phase of the reception clock signal which is equal to 0.

By way of example, this diagram corresponds to the following values:

$N=32$, $p=5$, $A_1=A_2=A_3=4$, $A_4=2$ and $A_5=1$.

It is postulated that each received message comprises at least p (namely five in this case) transitions. It is also postulated that the instant of initial reception of the message is known in order to initiate the synchronization process at this instant, that this instant is known to within T/2 (where T designates the period of the transmission clock signal) in order to ensure that the first transition received is in fact the first transition of the message. These assumptions apply particularly to operation in the frequency-evasion mode.

If the first transition of the message lags with respect to the corresponding transition of the reception clock signal, the phase of the reception clock signal is reduced by a quantity equal to $4 \cdot (2\pi/N)$, namely by four elementary steps. (It should be understood that the expression "corresponding transition" as used above is intended to mean the transition of the reception clock signal which would coincide with the $i^{th}$ transition of the received message, to within an accuracy of $2\pi/N$, if the transmission and reception clock signals were in phase). On the other hand, if the first transition of the received message leads with respect to the corresponding transition of the reception clock signal, the phase of the reception clock signal is increased by four elementary steps. Similarly, at the time of the second transition of the received message, four elementary steps are added to or deducted from the reception clock signal obtained after the first transition and so on in sequence up to the fifth transition, when one elementary step is added to or deducted from the reception clock signal obtained after the fourth transition.

Let $\phi$ be the relative phase shift between the received message and the reception clock signal. Since the phase of the reception clock signal can assume only discrete values ($2\pi/N$ represents its elementary variation step), a quantity $M \times (2\pi/N)$ is adopted, M being a whole number such that the quantity $M \times (2\pi/N)$ is as close as possible to the relative phase shift $\phi$ or in other words such that $$\left| \phi - M \frac{2\pi}{N} \right| < \frac{2\pi}{N}.$$

Whatever the value of the number M, it is known that there exists a sequence of decreasing positive integral values $A_i$ (where i varies from 1 to p) which verifies the relation $$\sum_{i=1}^{p} a_i A_i = M,$$

where $a_i$ is equal either to $+1$ or to $-1$, depending on whether the $i^{th}$ transition of the received message lags or leads with respect to the corresponding transition of the reception clock signal.

In consequence, irrespective of the relative phase shift existing at the outset between received message and reception clock signal, the method according to the invention makes it possible to restore the synchronization after p transitions of the received message. Acquisition of synchronization is therefore no longer dependent on the time-duration of the message as was the case in systems of the prior art. Synchronization of short messages is therefore ensured in a wholly reliable manner on condition, however, that these messages involve at least p transitions.

By means of this method, synchronization can be restored at higher speed than systems of the prior art since a tendency towards an approximately synchronized state is already exhibited during the first transitions, this approximate state being subsequently improved by means of a finer adjustment during the following transitions. In prior art systems, however, accuracy of phase corrections is constant throughout the period of synchronization.

In order to increase the accuracy of the method according to the invention, it is possible in the case of a given value of p to add to the sequence $A_i$ a term $A_{p+1}$ having a value equal to 1, as shown in FIG. 1.

For the same value of N, a number of sequences $A_i$ with different values of p can clearly be found, the minimum value of p being equal to $\log_2 N/2$.

Figure 2:
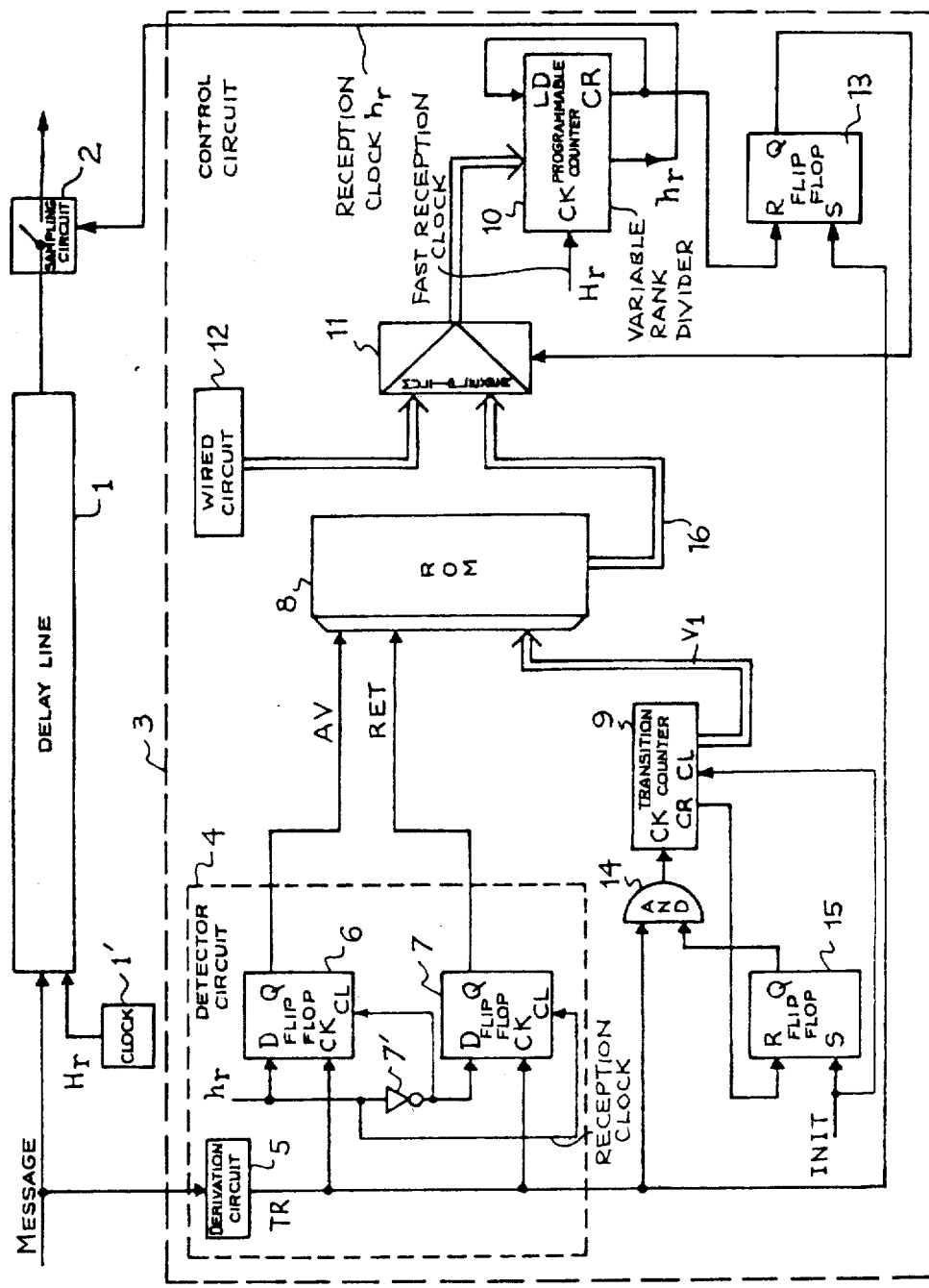
FIG. 2 is a diagram of the synchronization device according to the invention.

The message synchronization device shown in FIG. 2 includes a delay line 1 consisting, for example, of a shift register provided with a data input which receives the messages M applied to the input of the device, and a clock input which receives a fast reception clock signal $H_r$ having a frequency equal to N times the frequency f of transmission of the bits constituting the messages and having a fixed phase. The signal $H_r$ is delivered by a clock 1'. The output of the delay line 1 is connected to the input of a sampling circuit 2, the control input of which receives a slow reception clock signal $h_r$ (hereinafter designated as the reception clock signal) having a frequency f and delivered by a control circuit 3 which brings the phase of the reception clock signal into step with the phase of the received messages.

The phase control circuit 3 includes a circuit 4 for detecting either a lead or a lag in the transitions of the reception clock signal with respect to the transitions of the received messages.

The detector circuit 4 includes a derivation circuit 5 provided with an input which receives the messages M and with an output which delivers a signal TR such that one pulse is presented at each transition of the received messages M. The detector circuit 4 can be constituted (in accordance with a known design not shown in the drawings) by a cell consisting of a resistor and a capacitor.

The detector circuit 4 further includes a first D-type flip-flop 6, the input D of which receives the reception clock signal $h_r$ and the clock input CK of which receives the signal TR delivered by the derivation circuit 5. The detector circuit 4 also includes a second D-type flip-flop 7, the input D of which receives the reception clock signal which is inverted by means of an inverter 7' and the clock input CK of which receives the signal TR delivered by the derivation circuit 5. The flip-flop 6 is provided with a zero-reset input CL which is connected to the output of the inverter 7'. The flip-flop 7 is provided with a zero-reset input CL to which the reception clock signal $h_r$ is applied. The output Q of the flip-flop 6 delivers a signal AV for indicating that the transitions of the received messages lead with respect to the corresponding transitions of the reception clock signal $h_r$. The output Q of the flip-flop 7 delivers a signal RET for indicating that the transitions of the received messages lag with respect to the corresponding transitions of the reception clock signal $h_r$.

The phase control circuit 3 also includes a read-only memory (ROM) 8 or a programmable read-only memory, the address inputs of which receive the signals AV and RET as well as the output signals of a "modulo P" transition counter 9. The 2 p values $N \pm A_i$ are stored in the memory 8.

The control circuit 3 further includes a variable-rank divider 10 constituted for example by a programmable counter provided with a clock input CK which receives the fast reception clock signal $H_r$, and having loading inputs connected to the outputs of a multiplexer 11. The multiplexer 11 is in turn provided with first data inputs connected through a data bus 16 to the outputs of the ROM 8, second inputs connected to a wired circuit 12 representing the numerically coded value N, and a control input connected to the output Q of a flip-flop 13 of the "RS" type. The input R of the "RS" flip-flop 13 is connected to the carry output CR of the counter 10, the carry output CR of the counter 10 being in turn connected to the loading control input LD of the counter. The input S of the flip-flop 13 is connected to the output of the derivation circuit 5. The output of the counter 10 delivers the reception clock signal $h_r$.

The clock input CK of the counter 9 is connected to the output of an AND-gate 14 provided with a first input connected to the output of the derivation circuit 5 and with a second input connected to the output Q of an RS-type flip-flop 15. The input R of the flip-flop 15 is connected to the carry output CR of the counter 9, a signal INIT indicating an initial message reception being applied to the input S of said flip-flop 15. The counter 9 is also provided with a zero-reset input CL to which the signal INIT is applied.

Figure 3:
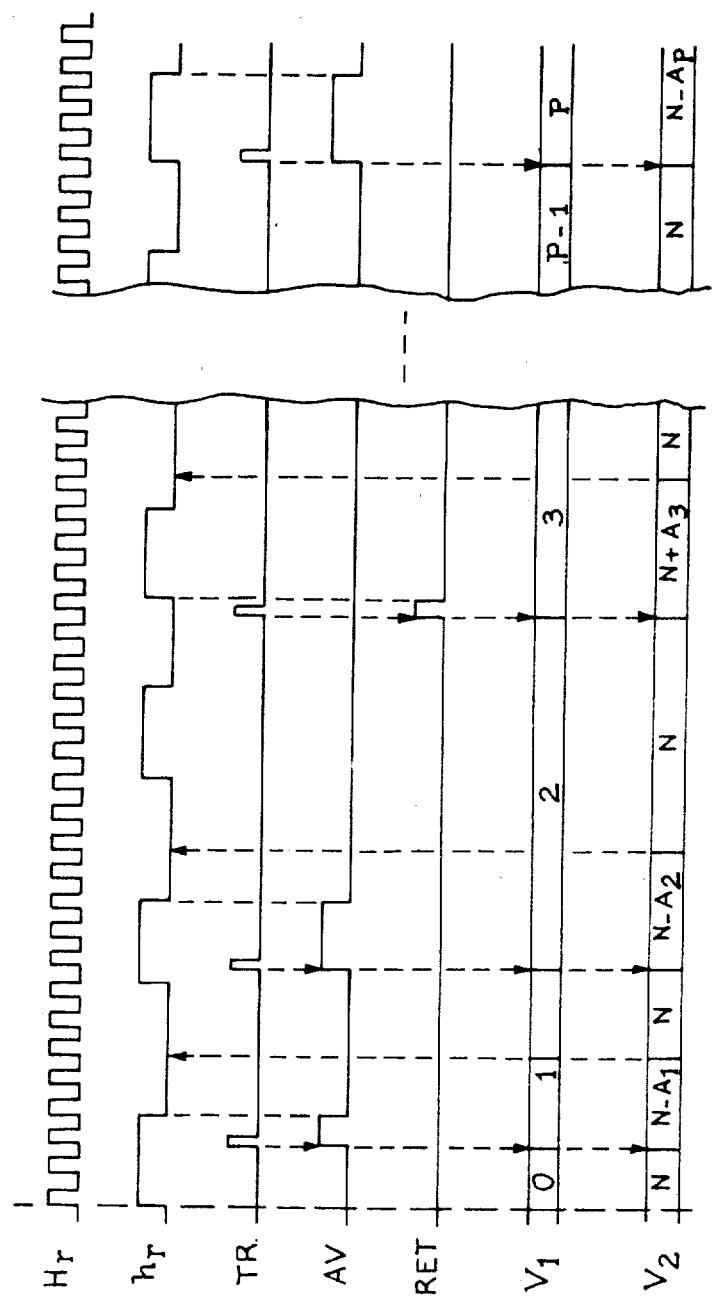
FIG. 3 is a diagram showing representative waveforms of signals as a function of time, these signals being obtained at different points of the device illustrated in FIG. 2.

The operation of the device shown in FIG. 2 will now be explained with reference to FIG. 3 in which signals obtained at different points of the device are represented by waveforms as a function of time. The first line of FIG. 3 represents the fast reception clock signal $H_r$ having a frequency Nf. The second line of FIG. 3 represents the reception clock signal $h_r$ having a frequency f. The third, the fourth and the fifth lines represent respectively the signal TR delivered by the derivation circuit 5, the signal AV delivered by the flip-flop 6 and the signal RET delivered by the flip-flop 7. The sixth line represents the content $V_1$ in decimal of the counter 9, which is applied to the address inputs of the read only memory 8. The seventh line represents the variations in the decimal value $V_2$ of the rank of the variable-rank divider 10 or, more precisely, of the loading signal of the counter which constitutes said divider.

At the first transition of the received message, the signal $V_1$ changes from the value 0 to the value 1. At the same time, and assuming that the first transition of the received message leads with respect to the corresponding transition of the signal $h_r$, the signal AV changes from the logic level 0 to the logic level 1 and then reverts to the logic level 0 at the following trailing edge of the signal $h_r$ whilst the signal RET remains at the logic level 0.

The read-only memory or ROM 8 which is addressed by these particular values of the signals AV, RET and $V_1$ then delivers the value $N-A_1$. The output Q of the RS flip-flop 13 having been set at the logic level 1 at the instant corresponding to the initial transition of the received message, the multiplexer 11 then selects the signals which are present at the output of the ROM 8. The counter 10 which is loaded with the value $N-A_1$ then restitutes a signal having the frequency $$\frac{N}{N-A_1}f$$

at the end of $N-A_1$ periods of the signal $H_r$, thus permitting a phase lead of the signal $h_r$ by $A_1 \times (2\pi/N)$. At the end of these $N-A_1$ periods of the signal $H_r$, the carry output CR of the counter 10 changes from the logic level 0 to the logic level 1, thus causing the output Q of the flip-flop 13 to changeover from the logic level 1 to the logic level 0 and the selection by the multiplexer 11 of the signals delivered by the circuit 12. The counter 10 which is then loaded with the value N divides the frequency Nf by the value N, which does not produce any phase shift on the signal $h_r$. The counter 10 thus continues to divide by the value N and to be automatically reloaded with the value N as long as any further transition occurs in the received message.

The same process is repeated when a second transition of the received message appears. In FIG. 3, it has also been assumed that the second transition leads with respect to the corresponding transition of the signal $h_r$. The counter 10 then produces on the signal $h_r$ a phase lead of $(2\pi/N) \times A_2$. Similarly, at the third transition of the received message, the counter 10 produces a phase lag of $(2\pi/N) \times A_3$ on the signal $h_r$. It is in fact assumed that this third transition lags with respect to the corresponding transition of the signal $h_r$. At the third transition of the received message, the signal RET then changes from the logic level 0 to the logic level 1 but subsequently reverts to the logic level 0 at the instant corresponding to the following leading edge of the signal $h_r$.

Synchronization is thus established in a progressive manner until the appearance of the $p^{th}$ transition of the received message, whereupon the clock signal $h_r$ is phase shifted, with a phase equal at $(2\pi/N) A_p$ and a determined sign in accordance with the same rules as before (for example a phase lag in accordance with FIG. 3). Synchronization is then restored; and in the event that in received message not any further transition occurs, the reception clock signal $h_r$ retains the phase thus acquired. In the event that in the received message further transitions occur, the phase of the reception clock signal oscillates in the vicinity of said phase with an amplitude which is equal to the elementary phase-shift step, in the event that $A_p$ has a value equal to 1 and the clock input CK of the transition counter is blocked between the $p^{th}$ transition of a given message and the first transition of the following message, by means of the AND-gate 14 and the flip-flop 15.

A certain number of alternative arrangements could be made in the synchronization device described in the foregoing without thereby departing from the scope of the invention. In particular, the variable-phase reception clock signal generator could quite conceivably be replaced by a device which would be capable of producing the different possible phases simultaneously, only one of these phases being selected at a given time. It would also be possible to contemplate the use of a conventional synchronization device in alternate sequence with the synchronization device according to the invention.

What is claimed is:

1. A method of synchronization of messages received by a receiver by means of an adjustable reception clock signal defining clock transitions, each message being constituted by bits comprising at least one predetermined whole number p of transitions, comprising:

detecting a sign of a phase difference $\phi$ between the transistions of the received message and the transitions of the reception clock signal;

controlling a sign of a phase of the reception clock signal in accordance with the sign of the detected difference between the transitions of the received message and corresponding transitions of the reception clock signal and producing a variation in absolute value of the phase of the reception clock signal by a quantity $A_i\cdot(2\pi/N)$ at each transition i of the received message, where i designates a whole number which is variable from 1 to "p", N is a whole number, $2\pi/N$ represents an elementary step of variation in phase of the reception clock signal and $A_i$ designates one element of a sequence $A_i$ of decreasing integral values such that $A_i$ verifies the relation $$\sum_{i=1}^{p} a_i A_i = M,$$

where M is a whole number such that $[(\phi - M)2\pi/N < 2\pi/N]$ $$\left| \phi - M\frac{2\pi}{N} \right| < \frac{2\pi}{N}$$

and where $a_i$ is equal either to $+1$ when a transition leads with respect to the corresponding transition of the reception clock signal, or to $-1$ when a transition lags with respect to the corresponding transition of the reception clock signal.

2. A device for synchronization of messages received by a receiver by means of an adjustable reception clock signal produced by a reception clock signal generator having phase control inputs, each message being constituted by bits transmitted with a bit frequency f and comprising at least one predetermined whole number p of transitions, comprising:

a delay line means for storing received messages;

a circuit for detecting transitiions of received messages;

a high-speed clock signal generator having a frequency N times higher than the bit frequency f of the bits constituting each message;

means for detecting a sign of a phase difference between the detected transitions of the received messages and corresponding reception clock signal transitions, said sign detecting means coupled to an output of the circuit for detecting transitions of received messages and to an output of the reception clock signal generator and having outputs corresponding to the detected sign;

sampling circuit means coupled to the delay line means for sampling the stored messages delivered by the delay line means, by means of the reception clock signal;

means for controlling the phase of the reception clock signal in dependence on the phase of the received messages, comprising, a reception clock signal generator coupled to the sampling circuit and to the high-speed clock signal generator, a transition counter connected to an output of said circuit for detecting transitions of received messages in order to count the number of transitions of the received message, and a read-only memory having addressing inputs connected to respective outputs of the sign detecting means and to the outputs of the transition counter in order to deliver a control value at each transition i of the received message to phase control inputs of the reception clock signal generator for producing a variation in phase of the reception clock signal by a quantity $\pm A_i(2\pi/N)$ as a function of the sign delivered by the sign detecting means, where $A_i$ of p designates one element of a sequence $N \pm A_i$ decreasing integral values which are stored in the form $N \pm A_i$ within the read-only memory and verifies the equation $$\sum_{i=1}^{p} a_i A_i = M,$$

where M designates a whole number by which the elementary phase quantity $2\pi/N$ must be multiplied in order to obtain the relative phase shift $\phi$ between the reception clock signal and the received message to within $2\pi/N$.

3. A device according to claim 2, comprising:
   means coupled to the transition counter for blocking the transition counter between two messages transmitted successively.

4. A device according to claim 3, wherein said blocking means comprises a "RS" flip-flop arranged so that an input R of said flip-flop is connected to a carry output of the transition counter, an input S of said flip-flop receives an initialization signal at the beginning of reception of a message, and an output Q of said flip-flop is connected to a first input of an AND-gate, a second input of the AND gate being connected to an output of said means for detecting transitions of the received messages and an output of said AND-gate being connected to the clock input of said transition counter.

5. A device according to claim 2, wherein the reception clock generator comprises:
   a variable-rank frequency divider having a signal input which receives the high speed clock signal delivered by the high-speed clock signal generator, which has a frequency equal to N times the frequency of the reception clock signal and has a fixed phase, and
   means for controlling the rank of the divider so as to ensure that said rank is equal to $N \pm A_i$ at the time of detection of a transition of the received message and to N when no transition takes place and between the "$i^{th}$" and "$i+1^{th}$" transitions of the received message when the division by $N \pm A_i$ has been performed.

6. A device according to claim 5, wherein the variable rank frequency divider comprises:
   a programmable counter having loading inputs and a loading control input connected to the rank controlling means, said variable-rank divider being incremented by the high-speed clock signal for delivering the reception clock signal.

7. A device according to claim 6, wherein the rank controlling means comprises:
   a wired circuit for generating a numerically coded value equal to N,
   a multiplexer having first inputs connected to the outputs of the read-only memory and second inputs connected to the wired circuit for continuously receiving the numerically coded value "N", and
   a "RS" flip-flop having an input R connected to a carry output of the programmable counter, an input S connected to output of the circuit for detecting transitions and an output Q connected to the control input of the multiplexer, the programmable counter having a carry output connected to a loading control input.

* * * * *